United States Patent
Reichow et al.

(10) Patent No.: US 9,806,522 B2
(45) Date of Patent: Oct. 31, 2017

(54) METHOD FOR THE CONTROLLED CONNECTION OF A PLURALITY OF ON-BOARD POWER SYSTEM BRANCHES OF A VEHICLE, CONTROL UNIT FOR CARRYING OUT THE METHOD AND ON-BOARD POWER SYSTEM

(71) Applicant: Continental Automotive GmbH, Hannover (DE)

(72) Inventors: Dirk Reichow, Wenzenbach (DE); Peter Völkl, Wenzenbach (DE); Tobias Galli, Regensburg (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 14/649,286

(22) PCT Filed: Nov. 28, 2013

(86) PCT No.: PCT/EP2013/074940
§ 371 (c)(1),
(2) Date: Jun. 3, 2015

(87) PCT Pub. No.: WO2014/086651
PCT Pub. Date: Jun. 12, 2014

(65) Prior Publication Data
US 2015/0314740 A1    Nov. 5, 2015

(30) Foreign Application Priority Data

Dec. 4, 2012   (DE) .................. 10 2012 222 208

(51) Int. Cl.
*G06F 7/00*   (2006.01)
*H02J 1/08*   (2006.01)
(Continued)

(52) U.S. Cl.
CPC ............ *H02J 1/08* (2013.01); *B60R 16/03* (2013.01); *H02M 3/04* (2013.01)

(58) Field of Classification Search
CPC ........... H02J 1/08; G06F 1/30; F02N 11/0866
(Continued)

(56) References Cited

U.S. PATENT DOCUMENTS

| 7,557,583 B2 | 7/2009 | Zettel et al. .................. 324/418 |
| 7,960,858 B2 | 6/2011 | Bolz .......................... 307/10.7 |

(Continued)

FOREIGN PATENT DOCUMENTS

| CN | 1970331 A | 5/2007 | ................ B60L 3/00 |
| CN | 101578203 A | 11/2009 | ............. B60R 16/03 |

(Continued)

OTHER PUBLICATIONS

English Translation for WO2011120871A1.*
(Continued)

Primary Examiner — Mahmoud Ismail
(74) Attorney, Agent, or Firm — Slayden Grubert Beard PLLC

(57) ABSTRACT

A method for controlled connection of a plurality of on-board power system branches is disclosed, wherein electrical power is exchanged between first and third on-board power system branches if an uncritical supply state is present and electrical power is exchanged between second and the third on-board power system branches if a critical supply state is present in the first or third on-board power system branch. In a critical supply state, the first on-board power system branch is disconnected from the third on-board power system branch by opening a first switching device, and the second on-board power system branch is then connected to the third on-board power system branch via a second switching device. A second actuation device (Continued)

that actuates the second switching device receives a switch state signal from the first actuation device and closes the second switching device only if the received signal signals an open first switching device.

6 Claims, 3 Drawing Sheets

(51) Int. Cl.
  *H02M 3/04* (2006.01)
  *B60R 16/03* (2006.01)
  *G06F 1/00* (2006.01)
(58) Field of Classification Search
  USPC .......................................... 701/36; 713/324
  See application file for complete search history.

(56) References Cited

U.S. PATENT DOCUMENTS

| | | | |
|---|---|---|---|
| 2002/0169991 A1* | 11/2002 | Weinold | G06F 1/30 713/324 |
| 2006/0137918 A1 | 6/2006 | Dinser et al. | 180/65.1 |
| 2011/0012424 A1 | 1/2011 | Wortberg et al. | 307/10.1 |
| 2013/0264869 A1 | 10/2013 | Klinkig et al. | 307/10.6 |

FOREIGN PATENT DOCUMENTS

| | | | |
|---|---|---|---|
| CN | 102529735 A | 7/2012 | ............ B60L 11/18 |
| DE | 10305058 B3 | 3/2004 | ............... H02J 7/14 |
| DE | 10248658 B4 | 4/2005 | ............. F02N 11/08 |
| DE | 102007029025 A1 | 12/2008 | ............. B60R 16/03 |
| DE | 102007062955 A1 | 7/2009 | ............. B60R 16/03 |
| DE | 102008054706 A1 | 6/2010 | .......... B60R 16/033 |
| DE | 102008062203 A1 | 6/2010 | ............. B60R 16/03 |
| DE | WO 2011120871 A1 * | 10/2011 | .......... F02N 11/0866 |
| DE | 102010054191 A1 | 6/2012 | ............. B60R 16/03 |
| EP | 2017935 A2 | 1/2009 | ............. B60R 16/03 |
| WO | 2011/120871 A1 | 10/2011 | ............. F02N 11/08 |
| WO | 2014/086651 A2 | 6/2014 | ............... H02J 1/08 |

OTHER PUBLICATIONS

International Search Report and Written Opinion, Application No. PCT/EP2013/074940, 26 pages, Jun. 16, 2014.
Chinese Office Action, Application No. 201380072218.1, 17 pages, dated Apr. 1, 2017.

* cited by examiner

METHOD FOR THE CONTROLLED CONNECTION OF A PLURALITY OF ON-BOARD POWER SYSTEM BRANCHES OF A VEHICLE, CONTROL UNIT FOR CARRYING OUT THE METHOD AND ON-BOARD POWER SYSTEM

CROSS-REFERENCE TO RELATED APPLICATIONS

This application is a U.S. National Stage Application of International Application No. PCT/EP2013/074940 filed Nov. 28, 2013, which designates the United States of America, and claims priority to DE Application No. 10 2012 222 208.1 filed Dec. 4, 2012, the contents of which are hereby incorporated by reference in their entirety.

TECHNICAL FIELD

The invention relates to the field of vehicle power supply and relates in particular to a method and a control unit which allow a stabilized voltage supply.

BACKGROUND

For the operation of electrical consumers, which are also designated as loads, on-board power systems are provided in motor vehicles. Some types of consumers are particularly sensitive to voltage dips or voltage spikes in the supply voltage, for example on-board power system electronics or even the lighting. If such sensitive consumers are subjected to a voltage dip or a voltage spike, then their function can be at least partly impaired. In this case, the operation of the vehicle can be impaired and/or undesirable side effects such as momentary darkening of the lighting of the motor vehicle arise.

It is furthermore known to use rechargeable batteries having low internal resistance and high electrical power to absorb voltage spikes or voltage dips. However, significant voltage dips arise particularly in the case of high, abrupt loadings despite high capacities and powers (and despite high space requirement associated therewith and high weight).

Furthermore, particularly in modern vehicles, dynamic electrical consumers are present, the operation of which can cause a severe voltage dip, for instance a starter motor of a start/stop module or a drive of an electrical steering system, such as are used in parking assistants. These dynamic consumers, in particular, are also activated during the operation of the vehicle and not just upon the initial cold start or when parking the vehicle.

Since operation is intended to be ensured between the initial cold start and the final parking of the vehicle, the document DE 10248658 B4, for example, proposes, for on-board power system stabilization of a vehicle having a start/stop module, providing a further energy store besides the customary on-board power system rechargeable battery, said further energy store being used for backup in the event of a voltage dip. According to said document, a changeover switch (not described in greater detail) switches between the customary lead-acid rechargeable battery and the second energy store, a voltage spike that arises as a result of the changeover being absorbed by a power distributor. The power distributor is based on a pulse-width-modulated power switch. Furthermore, the second energy store is operated by a DC/DC voltage converter, such that the overall outlay on power components for on-board power system stabilization is high. The solution proposed in said document is therefore associated with high costs. Furthermore, said document does not reveal any indication of a safety mechanism in the case of a fault in the changeover switch, such that the circuit described therein, in the event of faulty behavior of the changeover switch, can lead to the destruction of components of the circuit, in particular to the overcharging of the second energy store, which, when realized as a super capacitor, can rupture in the event of overcharging.

SUMMARY

One embodiment provides a method for the controlled connection of a plurality of on-board power system branches of an on-board power system of a vehicle, wherein electrical power is exchanged between a first on-board power system branch and a third on-board power system branch via a first switching device if a non-critical supply state is present in the first or in the third on-board power system branch, and electrical power is exchanged between a second on-board power system branch and the third on-board power system branch via a second switching device if a critical supply state is present in the third on-board power system branch; comprising the following steps: monitoring the supply state in the first or in the third on-board power system branch; for the case where a critical supply state occurs in the first or third on-board power system branch: disconnecting the first on-board power system branch from the third on-board power system branch by opening the first switching device, and after the first switching device has been opened, connecting the second on-board power system branch to the third on-board power system branch by closing the second switching device, wherein the first switching device is driven by a first drive device, and the second switching device is driven by a second drive device, which receives a switch state signal from the first drive device, wherein the second drive device drives the second switching device for closing only if the switch state signal signals an open first switching device.

In a further embodiment, the first drive device is driven by a switching signal; the switching signal is output to the first drive device from a state memory; an authorization signal is furthermore output to the second drive device from the state memory; and the second drive device drives the second switching device for closing only if the switch state signal signals the open first switching device and the authorization signal signals an authorization being present, wherein in particular the state memory outputs the switching signal for opening the first switching device and the authorization signal for closing the second switching device only if an enable signal, for instance from a supervisory unit, is present at the state memory, wherein the enable signal is output in the form of a binary SET signal.

In a further embodiment, the enable signal is output by a supervisory unit, the supervisory unit compares a speed signal of the vehicle with at least one predefined speed limit and outputs the enable signal only in the case of speeds which do not exceed the speed limit.

In a further embodiment, the supervisory unit furthermore receives: the switch state signal provided for the second drive device, at least one operating parameter or a supply state of the third on-board power system, a load signal representing load operation in the first on-board power system branch, switching signal output to the first drive device and/or a switching signal output to the second drive device, and wherein the supervisory unit outputs the authorization signal as a SET signal.

In a further embodiment, the supply state is monitored by comparing at least one operating parameter of the first and/or third on-board power system with a standard predefinition by a comparator, which outputs the supply state as comparison result, preferably as a binary CLEAR signal, or by evaluating a load signal representing load operation in the first and/or third on-board power system branch, preferably in the form of a binary CLEAR signal, wherein in the context of monitoring, as operating parameter(s) of the first and/or third on-board power system branch, a supply voltage in the first and/or third on-board power system branch and/or a current flow leading away from or toward the first and/or third on-board power system branch are/is compared with the standard predefinition, and in particular a switch-on signal for a starter motor within the first or third on-board power system branch is evaluated as load signal.

In a further embodiment, the monitoring is carried out by comparing by the comparator and the at least one operating parameter is represented by at least one analog signal, wherein the at least one analog signal is converted into at least one digital signal by an analog/digital converter, wherein the comparator compares the at least one digital signal representing the at least one operating parameter with the standard predefinition.

In a further embodiment, the comparator compares at least two operating parameters with the standard predefinition, the comparator generates an individual comparison result for each operating parameter, and the comparator outputs a comparison result corresponding to a logic combination of the individual comparison results, in particular a logic ANDing or some other logic combination of the individual comparison results.

Another embodiment provides a control unit for the controlled exchange of electrical power between a first, a second and a third on-board power system branch of an on-board power system of a vehicle, comprising: a first switching device, a first drive device connected thereto, and a second switching device and a second drive device connected thereto, and a first, second and third terminal configured for connection to the first, second and third on-board power system branch, respectively, wherein the first switching device is connected between the first terminal and the third terminal, and the second switching device is connected between the second terminal and the third terminal, wherein the second drive device has a switch state input connected to a switch state output of the first drive device, and the second drive device is configured to drive the second switching device for closing only if an open first switching device is signaled at the switch state input.

In a further embodiment, the control unit furthermore comprises a comparator, which is connected to a current determining unit configured for detecting a current through the first switching device or through a consumer of an on-board power system and/or to a voltage determining unit configured for detecting the voltage at the third on-board power system branch, preferably via an analog/digital converter or a level converter of the control unit, wherein the comparator is furthermore connected to a standard predefinition and is thereby configured to compare the detected current and/or the detected voltage with the standard predefinition and to output a supply state as result of the comparison at an output of the comparator, or wherein the control unit furthermore comprises an evaluation device having an input, said evaluation device being configured to evaluate a load signal present at the input and representing the load state of at least one component of the third on-board power system in order to output the supply state at an output of the evaluation device.

In a further embodiment, the control unit furthermore comprises a state memory having an input connected to the output of the comparator or the evaluation device, wherein the input of the state memory is embodied in particular as a CLEAR input, wherein the state memory has a first output for a switching signal, said first output being connected to an input of the first drive device for communicating a switching signal.

In a further embodiment, the state memory has a second output for an authorization signal, wherein the second drive device has an authorization input, and the second output is connected to the authorization input of the second drive device for signaling an authorization being present, and wherein the second drive device is configured to drive the second switching device for closing only if the open first switching device is signaled at the switch state input and an authorization signal representing an authorization is present at the authorization input.

In a further embodiment, the control unit comprises a supervisory unit, which has an output connected to an input of the state memory for communicating an enable signal, wherein said input of the state memory is preferably embodied as a SET input, wherein the supervisory unit furthermore has an input connected to an output of the state memory for communicating at least one state signal stored in the state memory.

In a further embodiment, the control unit furthermore comprises a DC/DC control module and a DC/DC converter connected thereto, wherein the DC/DC control module has an input connected to a circuit point to which the authorization input of the second drive device is also connected, wherein furthermore, the DC/DC control module is configured to suppress the operation of the DC/DC converter if no signal representing an authorization being present is present at the input of the DC/DC control module, wherein the DC/DC converter is connected between the first on-board power system branch and the second on-board power system branch.

In a further embodiment, the second drive device has a delay element, which is connected downstream of the switch state input or the authorization input and is thereby configured to delay the signal present at the switch state input or at the authorization input, or the second drive device has a delay element, which is connected upstream of a drive output connected to the second switching device, or the first drive device has a delay element, which is connected upstream of the switch state output of the first drive device.

Another embodiment provides a vehicle on-board power system comprising a control unit as disclosed above, furthermore comprising the first on-board power system branch connected to the terminal, the second on-board power system branch connected to the second terminal, and the third on-board power system branch connected to the terminal, wherein an internal combustion engine starter and preferably a starter battery, in particular a lead-acid rechargeable battery, are provided in the first on-board power system branch, an electrical second power store, in particular a lithium rechargeable battery or a super capacitor arrangement, is provided in the second on-board power system branch, and a generator is provided in the third on-board power system branch, said generator having a drive shaft suitable for connection to the output of an internal combustion engine, and the third on-board power system branch furthermore has a consumer having a minimal operating voltage, for instance an internal combustion engine controller or on-board electronics.

BRIEF DESCRIPTION OF THE DRAWINGS

Example embodiments are discussed in detail below with reference to the drawings, in which.

DETAILED DESCRIPTION

Figure 1:
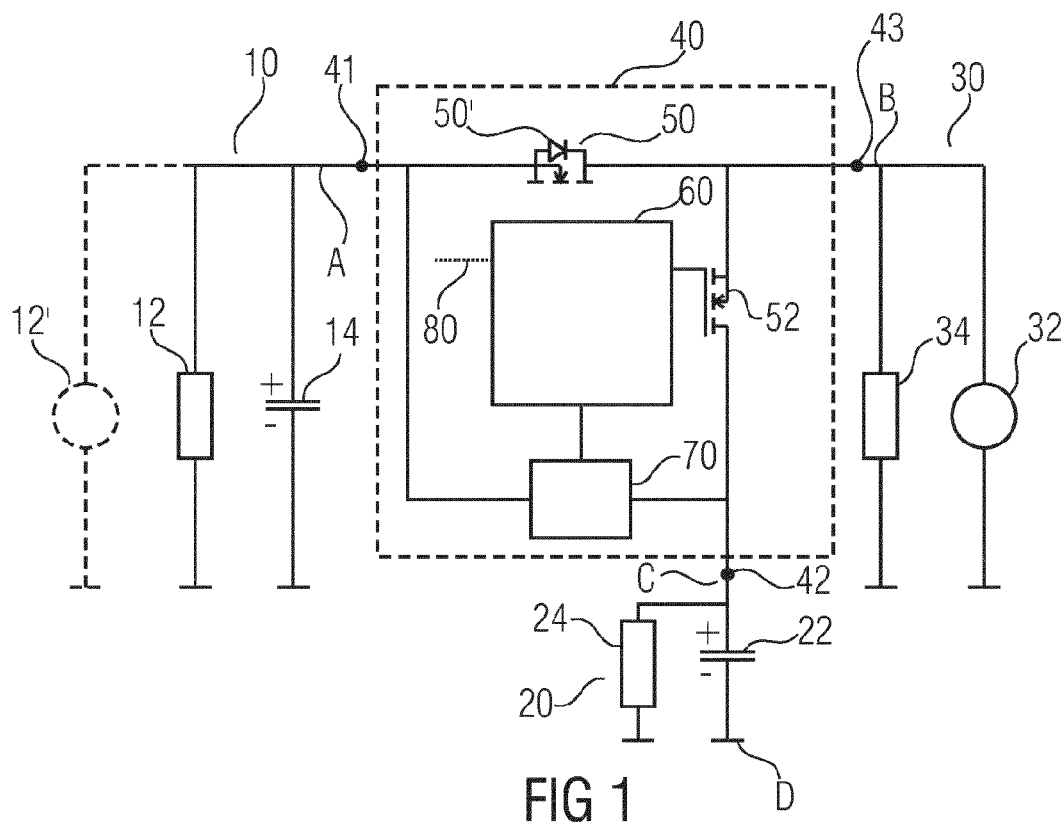
FIG. 1 is a schematic illustration of a vehicle on-board power system with one embodiment of a control unit according to one embodiment.

Embodiments of the invention make it possible in a simple manner to stabilize an on-board power system even in the case of electrical consumers having strong consumption dynamics. It is ensured that switching processes which are required in the context of stabilization cannot give rise to any hazard. In particular, existing energy stores are used effectively. Furthermore, costs, structural space and weight can be saved in comparison with the prior art. Furthermore, numerous power components associated with high costs and high heat to be dissipated can be saved. In comparison with the prior art, it is possible to realize a significantly more robust and more reliable network stabilization that avoids in particular an overloading of an additional energy store and/or of at least one other component in the on-board power system branches. The invention furthermore allows additional electrical energy to be switched in extremely rapidly, as a result of which a uniform voltage supply can be realized even in the case of a greatly varying current request by the consumer. In particular, the components used for control and supervision are equally cost-effective and efficient in terms of their function.

In the context of the procedure described here, provision is made for an on-board power system of a vehicle to be separated or subdivided into a plurality of on-board power system branches at least with regard to function. A first on-board power system branch comprises a dynamic consumer, which can cause voltage fluctuations on account of high and in particular abrupt current demand. A second on-board power system branch comprises an electrical power store, for instance a lithium rechargeable battery or a super capacitor arrangement comprising at least one super capacitor ("supercap"). The super capacitor arrangement can comprise one or a plurality of super capacitors, wherein, in the case of a plurality of super capacitors, the latter can be connected in parallel and preferably in series. In the event of an abrupt rise in the current demand, the power store is used for backup or for the supply of a sensitive consumer. A third on-board power system branch comprises the at least one sensitive consumer, in particular electrical consumers whose function is impaired due to voltage dips or voltage spikes, for instance on-board electronics (e.g. engine controller or ECU, engine control unit) or the interior or exterior lighting. The term sensitive consumer denotes electrical consumers which are sensitive toward voltage dips (or voltage spikes) and in the case of which, in particular, voltage dips can lead to malfunctions, or consumers whose function must be maintained for safety reasons. Sensitive consumers are therefore consumers whose function is sensitive toward voltage dips or excessive voltage increases or whose function is relevant to safety during the operation of the vehicle.

In the first on-board power system branch, a first power store is provided, for instance a starter battery and in particular a lead-acid rechargeable battery. The power store in the second on-board power system branch is designated as the second power store. The designation power store means that these stores are provided for the operation of power electronics or power electricals. The power stores store electrical energy.

During normal operation in which the voltage or the voltage fluctuation is in a nominal range, the first on-board power system branch is electrically coupled to the third on-board power system branch, such that the sensitive load is supplied by the first power store (or by an electrical generator that charges the first power store). In order to continuously recharge the first power store, an electrical generator, in particular an alternator driven by an internal combustion engine of the vehicle, is provided in the first on-board power system branch and preferably in the third on-board power system branch. During normal operation, the generator runs for continuously charging the first power store, as a result of which the sensitive consumer obtains a substantially constant on-board power system voltage.

The term power stores denotes electrical stores whose output power and/or whose storage capacity suffice(s) to compensate for voltage dips in an on-board power system branch of a vehicle for the most part or substantially completely. Power stores have a nominal peak current of at least 10 A, preferably at least 50 A, 100 A and particularly preferably at least 200 A, 500 A or 1200 A. The first power store can be a long-term power store such as a lead-acid rechargeable battery which is dimensioned like a starter battery, or can be some other electrochemical or else electrostatic energy store. This likewise applies to the second power store. In one specific embodiment, the second power store can be a short-term store, the capacity of which is significantly lower, for instance by a factor of at least 2, 10 or 20 or particularly preferably at least 50 or 100, than the capacity of the first power store. The second power store can be for example a super capacitor arrangement or a lead-acid or NiMH rechargeable battery. The first power store can be a lead-acid or NiMH rechargeable battery, for example. When a super capacitor arrangement is used as first or second power store, it preferably has a capacitance of at least 50 F, 300 F, 500 F, 1000 F, preferably of at least 5000 F, 10 000 F or 12 000 F.

In accordance with one procedure, a voltage dip is identified and handled as follows. If the dynamic consumer, i.e. for instance an electrical starter motor or an electrical steering drive, is activated, then it may be that the energy supplied by the first power store and also the energy supplied by the generator do not suffice to prevent significant voltage dips. The direct connection between the dynamic consumer, i.e. the source of disturbance, on the one hand, and the sensitive consumer, on the other hand, is interrupted in order to prevent the sensitive consumer in the third on-board power system branch from being influenced by the dynamic consumer in the first on-board power system branch. In order that this interruption of the direct connection does not lead to a power deficiency in the third on-board power system branch, in which the sensitive consumer is situated, the second on-board power system branch is connected up, in which the second power store is situated.

A comparable procedure provides for the second on-board power system branch to be connected up to the first on-board power system branch in order to prevent a voltage dip, wherein a connection between first and third on-board power system branches remains and the energy store of the second on-board power system branch is connected up in series with the energy store of the first on-board power system branch. What the two procedures mentioned above have in common is that the second on-board power system branch is connected up to the third on-board power system branch. In the context of connecting up the second on-board power system branch, the first on-board power system branch is disconnected completely, see first-mentioned procedure, or incompletely, see second-mentioned procedure. Complete disconnection is also referred to as the complete opening of a MOSFET, the substrate diode of which connects the source terminal to the drain terminal in the event of complete opening.

In principle, for supply or support, the second on-board power system branch can be connected up to the third on-board power system branch by a switching device, such that the operating voltage in the third on-board power system branch corresponds to the voltage at the second power store. In particular, connecting up is effected by parallel connection of the relevant on-board power system branches. Alternatively, the second power store can be connected up in series, such that the voltage in the third on-board power system branch corresponds to the voltage resulting from a series connection of the first on-board power system branch and of the second on-board power system branch. In the case of a series connection of the first and second power stores, the first power store can be connected to ground, while the second power store is connected to the positive pole of the first power store and to the positive on-board power system potential of the third on-board power system, or vice versa. Furthermore, the first power store can be connected to the positive on-board power system potential, while the second power store is connected to ground and to the negative pole of the first power store. The second power store can thus be connected up below or above the first power store with regard to the potential. The parallel connection can be regarded as current backup of the third on-board power system branch by the second power store. The series connection can be regarded as backup of the operating voltage in the third on-board power system branch by the second power store.

In the case of a voltage dip in particular in the third on-board power system branch, the second on-board power system branch (i.e. the second power store) is thus connected up. Connecting up is realized by a changeover switch, preferably by an electronic changeover switch, for example based on MOSFETs as switching device. In view of the numerous switching cycles of dynamic loads such as start/stop modules and electrical steering drives, it is evident that the changeover switch used must be configured for such a high number of changeover processes. For this reason, semiconductor-based changeover switches are preferable over electromechanical changeover switches.

It is provided that the changeover switch is realized in the form of two switching devices that are opened and closed alternately. Protection mechanisms are provided in order to prevent the two switching devices from being closed (or open) simultaneously.

Such a protection mechanism or reliable drive mechanism for the two switching devices is one of the essential aspects of the subject matter under consideration here. It is provided that the two switching devices are respectively driven by a drive device. One of the drive devices receives a switching state signal from the other of the two drive devices in order to be able to prevent simultaneous closing. The switching state signal represents the switching state of one switching device, such that the information about whether or not the first-mentioned switching device is actually closed or open is present at the drive device of the other switching device. In particular, the information about whether the first drive device actually drives the first switching device for closing or for opening is present. The drive devices can be regarded as drivers and can be realized for example as gate drivers for power MOSFETs.

This mechanism makes it possible, without using (additional) power components, to realize both simple and reliable safety mechanisms that prevent for instance overcharging of the first power store, an overcurrent at the power store or an overload of the switching devices or an on-board power system collapse. The drive device that receives the switching state signal drives that switching device which is configured for connecting up or separating the second on-board power system branch.

Therefore, a method for the controlled connection of a plurality of on-board power system branches of an on-board power system is described. The on-board power system whose on-board power system branches are connected in a controlled manner is preferably the on-board power system of a vehicle. The controlled connection concerns the controlled interruption and production of a conductive connection between on-board power system branches. The plurality of on-board power system branches comprise in particular a first, a second and a third on-board power system branch, which can be embodied as described here. If a nominal or non-critical supply state is present in the third on-board power system branch, electrical power is exchanged between the first on-board power system branch and the third on-board power system branch. The power is exchanged between the first and third on-board power system branches via a first switching device. The first switching device connects the first and third on-board power system branches in an electrically coupleable manner. The term nominal supply state denotes a state in which the current, the voltage and/or the temperature and in particular the state of charge (SOC) or the state of health (SOH) of the energy store (and in particular of the individual cells or individual capacitors of the energy store) are within standard intervals representing the dimensioning of the power store.

In particular, energy from a generator in the third on-board power system branch is supplied as electrical power to a first power store in the first on-board power system branch, in particular as electrical energy for charging the energy store. Equally, electrical energy can be transferred from the first on-board power system branch to the third on-board power system branch, for instance in order to back up the generator in the third on-board power system branch, such that a sensitive consumer in the third on-board power system branch receives electrical energy from the generator in the third on-board power system branch and/or from the first on-board power system branch, in particular transient or momentary energy boosts.

A critical supply state occurs particularly if an excessively low voltage, in particular a voltage dip, occurs at the sensitive consumer in the third on-board power system branch, i.e. in the third on-board power system branch itself. This is brought about by a dynamic consumer in the first (or in the third) on-board power system branch, for example a starter or an electrical steering system. If a critical supply state is present, electrical power is exchanged between the second on-board power system branch and the third on-board power system branch. In this case, the power is exchanged via a second switching device. The second switching device connects the second and third on-board power system branches in an electrically coupleable manner. The first switching device is preferably opened prior to the connection by the second switching device.

In particular, electrical energy from the second on-board power system branch is supplied to the third on-board power system branch via the second switching device. In this case, the second on-board power system branch serves as an additional energy source in order to back up the third on-board power system branch and in order to attain a higher operating voltage reliability there. In some embodiments, in the critical supply state, the first on-board power system branch is disconnected from the third on-board power system branch in order to disconnect dynamic consumers, i.e. sources of disturbance, in the first on-board power system branch from the third on-board power system branch, in which sensitive consumers are situated.

In order to connect the plurality of on-board power system branches in a controlled manner depending on the supply state, the supply state in the third on-board power system branch is monitored. There are various possibilities for monitoring the supply state in the third on-board power system branch. These are presented below and concern in particular voltage monitoring in the third on-board power system branch or monitoring of the current that flows through the first switching device and in particular that flows from the third on-board power system branch into the first on-board power system branch, or vice versa, or the temporal gradients thereof. In particular, the supply state of the at least one sensitive consumer in the third on-board power system branch is monitored. Furthermore, the supply state in the first or in the third on-board power system branch can be monitored, for example by monitoring of the voltage in said on-board power system branch or by monitoring of the current that flows through at least in one of the on-board power system branches. The supply state corresponds for example to a deviation of the monitored voltage from a standard value or a standard range, in particular downward, or corresponds to a standard current value being exceeded by the monitored current. From such exceedance it can be directly deduced that the supply state in the relevant on-board power system branch is critical as a result of the high current demand. Since initially the first on-board power system is connected to the third on-board power system, both have the same voltage, such that voltage dips in both on-board power systems can be detected by voltage measurement.

For the case where a critical supply state occurs in the third on-board power system branch, the second on-board power system branch is supplementarily connected, wherein the first on-board power system branch (or the on-board power system branch containing the source of disturbance) is preferably disconnected. In particular, the dynamic consumer (in particular the source of disturbance) is thereby disconnected from the sensitive consumer (in the third on-board power system branch), in particular by the opening of the first switching device. Furthermore, the second on-board power system branch is supplementarily connected to the third on-board power system branch in the sense of an electrical coupling in order to back it up, in particular by the closing of the second switching device after the first switching device has been opened.

It is provided that the first on-board power system branch is disconnected from the third on-board power system branch by the opening of the first switching device, wherein this disconnection means a disconnection of a direct connection, and an indirect connection can remain. After the first switching device has been opened and this has preferably also been verified, the second on-board power system branch is supplementarily connected. In particular, the second on-board power system branch is connected to the third on-board power system branch by the closing of the second switching device. The disconnection of the first on-board power system branch from the third on-board power system branch can be provided by a complete disconnection of the positive potential or of the potential related to ground being achieved, or by a direct connection between the first and third on-board power system branches being canceled (and replaced by an indirect connection, for instance a connection in series with the energy store of the second on-board power system). The term complete disconnection also denotes the opening of a MOSFET switch as switching device, wherein a substrate diode remains between the current terminals (drain and source). In this case, the substrate diode extends from source to drain (forward direction).

In particular, when the first on-board power system branch is disconnected from the third on-board power system branch, a direct connection between the first on-board power system branch and the third on-board power system branch is disconnected and replaced by an indirect connection. In the case of the indirect connection, the second on-board power system branch can be provided for adding the voltages of the first and second on-board power system branches by the indirect connection. Therefore, the disconnection of the first on-board power system branch from the third on-board power system branch here means the disconnection of a direct connection, such that either an indirect connection (via a further voltage source constituted by the second on-board power system branch) results, or means a complete disconnection of the first on-board power system branch in order to connect the second on-board power system branch instead of the first on-board power system branch to the third on-board power system branch, for example as parallel connection. A complete disconnection is provided in particular by the interruption of at least one potential connection.

It is provided that the first switching device is driven by a first drive device and the second switching device is driven by a second drive device. The second drive device receives a switch state signal from the first drive device. The second drive device is configured to be able not to drive the second switching device for closing if the switching state signal signals a closed first switching device. This prevents a closed switching state of the first switching device from temporally overlapping a closed switching state of the second switching device. The closed state of the first switching device and therefore a closed first switching device is determined on the basis of a drive voltage present at the switching device and/or by detection of the current that flows through the switching device or is fed thereto, and/or by detection of the on resistance of the switching device.

The second drive device furthermore receives, in accordance with one preferred embodiment, an incoming authorization signal. The second drive device is designed, in the absence of authorization such as is signaled by the authorization signal, to be able not to drive the second switching device for closing. The second drive device drives the second switching device for closing only if the switching state signal signals an open first switching device. In particular, the second drive device drives the second switching device for closing only if the authorization signal signals an authorization being present. If the switching state signal signals a closed first switching device or the authorization signal signals an authorization not being present, then the second drive device is able not to drive the second switching device for closing. As a result, the closing of the second switching device or the driving by the second drive device to close the second switching device is inhibited. This can be supported in particular by a barrier with respect to the outputting of a closing signal to the second switching device within the second drive device.

While the first drive device is driven with a desired signal representing the desired closed state of the first switching device, the switching state signal corresponds to an actual state of the first drive device, for example a gate-source signal, in particular the voltage level of the gate-source signal that is actually present at the first switching device. The actual state can be detected by the voltage level of the gate-source signal being compared with a threshold value. The threshold value can preferably be adjusted from a predefined threshold value to at least one other threshold value in order thus to be able to set the result of the comparison in a targeted manner. This allows the checking of the switching devices and the use of a multiplicity of circuit technologies for the switching devices.

One embodiment provides for the first drive device to be driven by a switching signal. The switching signal is output to the first drive device from a state memory. The authorization signal is output to the second drive device from the state memory. The switching signal output to the first drive device from the state memory corresponds to the desired switching signal described above.

In accordance with one aspect of the invention, the state memory outputs the switching signal for opening the first switching device and the authorization signal for closing the second switching device only if an enable signal is present. In particular, the enable signal is output in the form of a binary SET signal. The enable signal can originate from a superordinate supervisory unit. The enable signal is output to the state memory. The state memory can have the function of a flip-flop, in particular, wherein the SET signal with regard to the state of the flip-flop dominates a CLEAR signal that is communicated to the flip-flop.

The supply state within the on-board power system can be monitored by measurement and evaluation of operating parameters of the third on-board power system branch or can be monitored by evaluation of a load signal representing load operation that leads to voltage dips. The load signal can thus represent instantaneous and future critical supply states that arise upon the relevant consumer being switched on, wherein substantially instantaneous or imminent critical supply states can be detected during the detection and evaluation of operating parameters of the third on-board power system. It is provided that the supply state is monitored by an operating parameter of the third on-board power system being compared with a standard predefinition. The standard predefinition is also designated in a shortened form as predefinition. The standard predefinition is preferably configurable or programmable, and is preferably stored in a memory. The comparison is carried out by a comparator which outputs the supply state as the comparison result. Preferably, the comparator outputs the supply state as a CLEAR signal. As already described, for the state memory the SET signal is dominant relative to the CLEAR signal. As a result, the first switching device is dominant in the on-board power system. This enables a high functional reliability during the driving of the switching devices. The comparator should generally be regarded as a comparison device. The comparison can comprise filtering, in particular low-pass or bandpass filtering, and/or the use of a hysteresis, wherein, for instance, a voltage or current signal representing the supply state is filtered and/or mapped with a hysteresis function before it is fed to the comparator or while it is being processed by the latter. Bandpass filtering preferably has an order higher than one.

As operating parameter of the third on-board power system, use is made of a supply voltage in the third on-board power system branch, in particular the on-board power system branch voltage currently present, a current flow or power flow leading away from or toward the third on-board power system branch, a (temporal) gradient of the supply voltage, a (temporal) gradient of the current flow, or a combination thereof. The operating parameter or parameters is/are compared with a standard predefinition. If a plurality of the abovementioned physical quantities as operating parameters are compared with the standard predefinition, then the standard predefinition comprises individual standard predefinition components for each of said quantities. The standard predefinition can thus be regarded as a vector or scalar. The standard predefinition can be provided by one or a plurality of limits or by one or a plurality of standard ranges for the relevant operating parameters.

The operating parameter can be provided by an externally generated control command corresponding to a load signal. The load signal represents load operation to be driven in the first on-board power system branch. The load signal emitted can be in particular a switch-on signal of an electrical starter motor or of an electrical steering drive which is situated within the first on-board power system branch. The load signal can furthermore be a switch-on signal of a dynamic consumer within the first on-board power system branch, which in operation is suitable for initiating a critical supply state in the third on-board power system branch if the first on-board power system branch is connected to the third on-board power system branch and the second on-board power system branch is not used for backup. The switch-on signal can be a present command or can be a signal from which it is possible to derive the fact that the starter motor is switched on or is intended to be switched on. The load signal thus represents the planned or actually incipient operation of a consumer in the first on-board power system branch which is suitable for bringing about a critical supply state in the third on-board power system branch if the third on-board power system branch is directly connected to the first on-board power system branch and the second on-board power system branch is not used for backup. The load signal can originate in particular from an (external) ECU or other on-board electronics within the vehicle, and in particular from a unit such as actively influences the electrical energy management within the vehicle.

Said unit can be present externally with respect to the control unit disclosed here.

In accordance with one aspect of the invention, the monitoring is carried out by comparison by the comparator and at least one operating parameter is represented by at least one analog signal. The analog or digitized signal corresponds in particular:

to the voltage of the first or third on-board power system, i.e. to the voltage with which the sensitive consumer (i.e. sensitive to voltage dips) is operated, to the current intensity of the current flow away from or toward the third on-board power system branch, to a signal that represents the gradient of the voltage in the first or third on-board power system branch, or to a signal that represents the gradient of the current flow which leads away from the third on-board power system branch or leads toward the latter.

The term gradient denotes in particular the temporal gradient, i.e. the time derivative of the relevant signal.

The standard predefinition can be provided in the form of a lower or upper limit which, upon being reached or exceeded or undershot, has the effect that the evaluation by the comparator changes. In particular, it can be provided that the comparator compares the voltage in the third on-board power system branch with a lower limit which, when undershot, means that a contravention of the standard predefinition should be assumed. Furthermore, the standard predefinition can comprise an upper limit current which, when exceeded, means that a contravention of the standard predefinition should be assumed. The current used for comparison with the limit current corresponds to the current flow that leads away from the third on-board power system branch. The standard predefinition can comprise in particular an upper limit in the form of a maximum rate of rise or rate of fall, wherein the rate of rise relates to the temporal profile of the abovementioned operating voltage of the third on-board power system branch or to the current flow that leads away from the third on-board power system branch.

The rate of rise or the rate of fall corresponds in particular to the magnitude of the temporal change in the voltage or current. The temporal change corresponds to the (temporal) gradient.

In accordance with a further aspect of the invention, the at least one analog signal is converted into a digital signal by an analog/digital converter. Alternatively, the analog signal is converted by a level converter. The comparison is carried out with the digital signal or with the converted signal. In particular, the comparator compares the at least one digital signal representing the at least one operating parameter with the standard predefinition. As a result of the digital implementation of the comparator, faster processing speeds can be achieved, particularly in the case of an implementation in an ASIC or in some other integrated or else monolithic circuit.

Furthermore, it is provided that the comparator compares at least two operating parameters with the standard predefinition. The comparator generates an individual comparison result for each operating parameter. In particular, the standard predefinition consists of at least two individual predefinitions which are compared in each case with an operating parameter and for which the comparator generates an individual comparison result. For evaluation, it is provided that the comparator outputs a comparison result that corresponds to a logic combination of the individual comparison results. The logic combination can comprise one or a plurality of ANDings, ORings and/or XORings or other standard logic combinations. In particular, the comparator outputs a comparison result that corresponds to a logic ANDing of the individual comparison results. This ensures that an individual result that leads to the deviation of an operating parameter from an individual predefinition does not directly initiate a changeover process. Rather, the logic combination ensures that in a relevant manner a plurality of operating parameters are used for distribution and a changeover process is initiated only if two or more operating parameters deviate from the standard predefinition or from the individual predefinitions. The logic ANDing can be provided within the comparator or can be connected downstream thereof.

It is furthermore provided that an enable signal is output by a supervisory unit. The state memory receives this enable signal. The state memory generates the authorization signal on the basis of the enable signal. The supervisory unit compares a speed signal of the vehicle with at least one predefined speed limit (or with some other standard speed predefinition). It is only in the case of speeds that do not exceed the speed limit that an enable signal is output on the basis of which the state memory outputs an authorization signal corresponding to an authorization being present. Otherwise, an enable signal is output on the basis of which the state memory outputs an authorization signal corresponding to an authorization not being present. (As an exception, the effect of the speed limit can be suppressed or adapted in sailing mode.) This ensures that the authorization signal can be generated and the changeover is authorized only if a predefined speed limit is not exceeded. This furthermore ensures that at speeds above the speed limit the energy supply of the third on-board power system branch does not change and the switches are not changed. This prevents a situation in which, at high, critical speeds, a changeover process is carried out which can be hazardous in the case of faulty components, in particular of the switching devices. The speed signal can originate in particular from an ECU or other vehicle electronics, in particular from a navigation system or from a tachometer system or a slip regulating system or anti-lock braking system of the vehicle or further systems that can determine the speed of the vehicle. What is achieved as a result is that the changeover according to the invention is blocked at higher speeds by virtue of the authorization not being given. In the absence of authorization, the switching states of the first and second switching devices are not changed. The speed limit is for example approximately 20 km/h, 30 km/h, 50 km/h or 70 km/h. In sailing mode, i.e. if the internal combustion engine of the vehicle supplies no traction power and/or is shut down, the blocking of the changeover of the switching devices can be canceled.

It is furthermore provided that the supervisory unit receives data which enable it to monitor the two drive devices, the state memory and preferably also the comparator with regard to their function. In this regard, the supervisory unit forms a secondary system having at least some functions of the abovementioned elements in order to enable monitoring. The supervisory unit receives at least one of the following signals:

the switching state signal provided for the second drive device,
at least one operating parameter or a supply state of the third on-board power system,
the load signal representing present or future load operation, i.e. operation of a dynamic consumer in the first on-board power system branch, or
a switching signal output to the first and/or second drive device.

By these signals or items of information, the supervisory unit can comprehend the functions of the abovementioned components and intervene in the event of a deviation from the envisaged behavior.

The supervisory unit can furthermore be configured to generate the standard predefinition or at least one of the individual predefinitions and to communicate it/them to the comparator. The comparator therefore receives one or a plurality of threshold values from the supervisory unit.

One specific embodiment provides for the evaluation of a load signal and the comparison of at least one operating parameter with a standard predefinition to be logically combined in order to generate the supply state signal (and, if appropriate, the authorization signal following therefrom). By way of example, a first signal can be generated by the evaluation, and a second signal can be generated by the comparison. These signals are combined by a logic combination—for instance by an ANDing—to form a signal representing the supply state.

In accordance with a further embodiment, the load signal is used to control the operation of the comparator. For this purpose, the load signal can be evaluated, wherein the standard predefinition or at least one of the individual predefinitions is altered in accordance with the load signal. In particular, in the case of a load signal representing operation of a dynamic consumer, the standard predefinition can be altered to the effect that the comparator becomes more sensitive to the at least one operating parameter. In this case, the load signal corresponds to a present voltage dip or a voltage dip that is to be expected on account of control commands to a load in the first on-board power system branch. In particular, as desired predefinition a threshold value can be raised or reduced and/or a filter with which the load signal is filtered can be varied, depending on the presence of a load signal representing operation of a dynamic consumer. By way of example, firstly provision can be made of a threshold value corresponding to a minimum operating voltage which, when undershot, means that a voltage dip should be assumed. Upon the occurrence of operation of a dynamic consumer (signaled by the load signal), said threshold value is raised. The comparison result of the comparator is thus already altered in the case of a voltage which occurs during customary operation. Equally, a threshold value representing a maximum current as operating parameter predefinition can be reduced, such that in the case of low currents the comparator already outputs a supply state signal to the state memory which corresponds to a critical supply state. Even if no critical supply state that would result from the operating parameters is actually present in this case, on account of the imminent operation of a dynamic consumer there is nevertheless the need to disconnect the first on-board power system branch in order to supplementarily connect the second on-board power system branch, and so the outputting of the corresponding supply state is correct.

In accordance with a further manner of consideration, the comparator alters the response threshold of the comparator by virtue of a change in the standard predefinition or the at least one individual predefinition, such that the comparator function of the comparator is suppressed. In the event of a corresponding change in the standard predefinition, the comparator forwards the load signal representing load operation, without dedicated evaluation, as a supply state signal representing a critical supply state. By virtue of the fact that the supervisory unit changes the standard predefinition (or only an individual predefinition) of the comparator, the function of the comparator is deactivated. As a result, in the case of a corresponding load signal, the comparator outputs a supply state signal corresponding to a critical supply state independently of the operating parameters present at the comparator.

Furthermore, a description is given of a control unit for the controlled exchange of electrical power between a first, a second and a third on-board power system branch of an on-board power system of a vehicle. The control unit is configured for carrying out the method disclosed here.

The control unit comprises a first switching device, a first drive device connected thereto, and a second switching device and a second drive device connected thereto. The second drive device is connected in particular to a control input of the first switching device and the second drive device is connected to the control input of the second switching device. The first and second switching devices are in each case driver circuits.

The control unit furthermore comprises a first, a second and a third terminal, which are configured for connection to the first, second and third on-board power system branches, respectively. The first, second and third terminals are suitable, in particular, for transferring currents of significantly more than one ampere and in particular of one hundred or more amperes. The first, second and third terminals can be realized in each case by an electrical plug and/or screw contact. One of the terminals or a fourth terminal can be configured to be connected to ground. The control unit can be a four-pole network or, in the case of an embodiment such as is illustrated in FIG. 3c, a three-pole network. Poles can also be assigned to the control unit or circuit topologies described here, wherein each terminal (as electromechanical realization) corresponds to an individual pole (as topological node).

The first switching device is connected between the first and third terminals. The second switching device is connected between the second and third terminals. As a result, the first switching device is configured to control the electrical connection between the first and third terminals, and the second switching device is configured to control the electrical connection between the second and third terminals. The second drive device has a switch state input connected to a switch state output of the first drive device. The second drive device is configured to control the switch state of the second switching device on the basis of a signal present at the switch state input. The switch state output of the first drive device is configured to supply a signal representing the actual circuit state of the first switching device, for instance a level of a gate terminal of the first switching device. The second drive device is configured to drive the second switching device for closing only if an open first switching device is signaled at the switch state input. Preferably, the second drive device is configured to drive the second switching device for closing only if an open first switching device is signaled at the switch state input and an authorization signal representing an authorization is present at the authorization input.

The second drive device preferably comprises a logic circuit that logically combines the switch state input and the authorization input, in particular by an ANDing. The logic circuit can be provided in particular by a processor having corresponding software or by a logic gate, such that the logic circuit can be designated more generally as logic.

One aspect of the control unit provides for the latter furthermore to comprise a comparator, preferably a comparator as described above. The comparator has at least one input, preferably two inputs, configured to be connected to a current determining unit or a voltage determining unit. The current determining unit is preferably equipped for detecting the current through the first switching device. The voltage determining unit is configured to detect the voltage at the third on-board power system branch. For this purpose, the voltage determining unit can be connected to a corresponding terminal in order to measure the voltage within the third on-board power system branch. The control unit preferably furthermore comprises an analog/digital converter connected upstream of the comparator. In this case, the comparator is a digital comparator. Preferably, the control unit is only configured to be connected to the voltage and/or current determining unit. However, an alternative embodiment provides for the control unit to comprise the voltage determining unit and/or the current determining unit.

The control unit furthermore comprises a standard predefinition. The standard predefinition is connected to the comparator. The comparator is thus configured to compare the detected current and/or the detected voltage with the standard predefinition. The comparator is furthermore configured to output a supply state at an output of the comparator as the result of the comparison.

As an alternative or in combination with respect thereto, the control unit can furthermore comprise an evaluation device having an input. The evaluation device is configured to evaluate a load signal present at the input of the evaluation device. The load signal represents the load state of at least one component of the third (or first) on-board power system and represents in particular a present or future, expected load state. The load signal can be in particular a command for switching on the consumer in the third on-board power system branch. As a result, the evaluation device is configured to output the supply state at an output of the evaluation device. The supply state is thus derived from the load signal, wherein the evaluation device can receive the load signal with the aid of its input. Both comparator and evaluation device are provided for the specific embodiment thereof, and the evaluation device is connected to an input of the comparator in order to change the standard predefinition applicable to the comparator. The standard predefinition can be stored in a memory, in particular in a write-once memory, a write-many memory, or in a read-only memory.

The control unit furthermore comprises a state memory. The state memory has an input connected to the output comparator or the evaluation device. The input of the state memory is embodied in particular as CLEAR input. The state memory therefore provides a functionality of a flip-flop, wherein the CLEAR input of the state memory corresponds to a CLEAR command of a flip-flop. The state memory has a first output for a switching signal, said first output being connected to an input of the first drive device. In particular, the first input of the state memory is connected to the input of the first drive device for communicating a switching signal. The state memory has a second output for an authorization signal. The second output is connected to the authorization input of the second drive device for signaling an authorization being present. The so-called connections are direct connections, in particular.

Furthermore, the control unit can comprise a supervisory unit. The supervisory unit has an output connected to an input of the state memory, which serves for communicating an enable signal. The output of the supervisory unit is configured for communicating the enable signal. Preferably, said input of the state memory which is connected to the output of the supervisory unit is embodied as a SET input. Here, too, the state memory preferably has a flip-flop functionality. The SET input has priority over the CLEAR input. The state memory is therefore designed, when a SET signal is present, to ignore a CLEAR signal possibly present at the same time and choose a state in accordance with the SET signal. The functionality of the state memory corresponds in particular to an asynchronous flip-flop, in particular a flip-flop having a SET input and a CLEAR input. The functionality of the state memory can correspond in particular to a level-dependent trigger or an edge-controlled trigger. The supervisory unit is configured to diagnose or retrieve the state of the comparator, in particular via a connection which runs via the state memory or which is directly linked to the comparator. The SET signal is set to be active as the basic setting, even if there is no connection to the supervisory unit. As a result, operation is ensured in the event of faults occurring in particular in the driving.

The supervisory unit furthermore has an input connected to an output of the state memory, in particular for communicating at least one state signal stored in the state memory.

The control unit furthermore comprises a DC/DC converter and a DC/DC control module, to which the DC/DC converter is connected. In particular, an output of the DC/DC control module is connected to an input of the DC/DC converter. The DC/DC control module has an input connected to a circuit point to which the authorization input of the second drive device is likewise connected. In particular, said input of the control module is designed, and connected within the control unit, to receive a signal corresponding to the signal at the authorization input of the second drive device. The DC/DC control module is configured to suppress the operation of the DC/DC converter if no signal representing an authorization being present is present at the input of the DC/DC control module. Therefore, if no authorization is represented by the authorization signal, then the DC/DC control module suppresses the operation of the DC/DC converter.

The authorization signal can signal an authorization not being present in two ways: as a deliberately output signal having a level corresponding to an authorization signal not being present, or by an authorization signal having an undefined signal level ("free floating") that does not correspond to a signal level representing an authorization signal being present. An authorization signal not being present can thus be signaled in a targeted manner by a specific level, or by the fact that an undefined level is present, for instance by virtue of the isolation of a transistor output, which, however, does not reach the level necessary for signaling an authorization signal being present.

A further embodiment provides for the second drive device to have a delay element, which is connected downstream of the switch state input or the authorization input. As a result, the second drive device is configured to delay the signal present at the switch state input or at the authorization input. Alternatively, the second drive device has a delay element connected upstream of a drive input connected to the second switching device. Furthermore, the first drive device can have a delay element connected upstream of the switch state input of the first drive device. What is achieved by this measure is that the second drive device is driven in a delayed manner relative to the first drive device.

Instead of or in combination with a delay element, a hysteresis element can also be provided, in particular within the comparator, in order not to provoke undesirable momentary switching state changes in the event of slightly varying signals at the input of the comparator. If the comparator comprises a logic circuit in order to combine individual results, then the at least one hysteresis element is connected upstream of the logic. In particular, the hysteresis element is connected downstream of the at least one input of the comparator. The number of hysteresis elements or the number of hysteresis functions corresponds to the number of inputs of the comparator.

One embodiment of the invention provides for the first drive device to be self-inhibiting and to close the first switching device in an energyless state. The second drive device is preferably configured to drive a closing process of the second switching device only in the case of a high level. As a result, in the case of a multiplicity of faults, the standard state is produced, i.e. a closed first switching device and an open second switching device, particularly in the case of faults in the current supply of the control unit.

The first and also the second switching devices are in particular semiconductor switches, preferably transistors and particularly preferably MOSFETs or bipolar transistors or IGBTs. In particular, as switching device, use can be made of semiconductor components with a diode between the two power terminals, for example with a substrate diode. The latter can be used for supplying the third on-board power system branch from the first on-board power system branch in the event of a failure of the drive devices, or of the driving of the drive devices. In particular, the second switching device can be provided not just as an on/off switch, but rather as a switching element which, in the switched-on state, is configured to set a specific potential, in particular as a voltage regulator. Finally, the first and second switching devices can be embodied as relays.

The control unit described here can be provided in particular for voltages of less than 60 volts, for example for on-board power system branches having 12, 24 or 48 volts. The power terminals of the control unit can be provided for the same voltage or can be provided for different voltages, particularly if provision is made for adding voltages of two on-board power system branches by the circuitry interconnection of the power terminals (by switchable series connection). If provision is made, by the control unit, for two of the on-board power system branches to be connected in series by the control unit, then at least one of the on-board power system branches can also have a voltage lower than 12 volts, for example 5 volts. In particular, the second on-board power system branch can have a different and preferably lower standard voltage than the third on-board power system branch.

The control unit can be designed, with regard to voltage and current, to be connected via the power terminals to electrochemical and/or electrostatic energy stores, in particular to lead-acid rechargeable batteries, lithium-ion rechargeable batteries, nickel-metal hybrid rechargeable batteries, super capacitor arrangements, super capacitors (supercaps) or, in particular, double-layer capacitors. In particular, the control unit can be configured to connect the first, second and third on-board power system branches to one another, wherein in the first on-board power system branch provision is made of a lead-acid rechargeable battery, for example, and in the second on-board power system branch a lithium-ion rechargeable battery or a super capacitor arrangement or a supercap. The latter can have a significantly lower capacity than the lead-acid rechargeable battery, but can be equipped with a maximum current in the magnitude range of the lead-acid rechargeable battery, and a generator can be provided in the third on-board power system branch. The first and second energy stores can be of the same type or of different types. The capacity of the first energy store can correspond to that of the second energy store, can be greater than the capacity of the second energy store, for instance by factors of at least 2, 5, 10, 50 or more, or else can be less than the capacity of the second energy store.

The DC/DC converter can be provided, in particular, for transferring energy between the first and second terminals or on-board power system branches. The DC/DC converter can be bidirectional or can be unidirectional, in particular configured for transferring energy into the second on-board power system branch or out of the latter.

The control unit can be realized by a hardwired circuit, a configurable or programmable circuit and associated software, and by a combination thereof. In particular, the control unit can be realized by an ASIC or FPGA, preferably by a monolithic integrated circuit. Alternatively or in combination therewith, microprocessors can be used, in particular microprocessors having a small bit width. This makes it possible to use low-cost microprocessors having a bit width of just 8 bits or 10 bits. In particular, the supervisory unit can be realized by a circuit that differs from further circuits realizing further components of the control unit. In particular, the drive devices, the comparator and/or the state memory are/is implemented by the same electronic component, in particular by an ASIC. In this case, the analog/digital converter can also be part of the component. The DC/DC control module can be part of a monolithic integrated circuit or else of an ASIC or part of a component that also realizes the comparator and the two drive devices. The standard predefinition can be realized as a storage element within that electronic component which realizes the abovementioned components of the control unit and can be configured and programmed.

Finally, a vehicle on-board power system comprising a control unit as described here is presented. The vehicle on-board power system comprises the first, second and third on-board power system branches. An internal combustion engine starter and a starter battery, in particular a lead-acid rechargeable battery are provided in the first on-board power system branch. The internal combustion engine starter corresponds to the electrical component which can occur as a source of disturbance and generate voltage dips within the vehicle on-board power system. An electrical second power store, in particular a lithium rechargeable battery or a super capacitor arrangement, is provided in the second on-board power system branch. The electrical second power store has a current output capability that approximately corresponds to the current output capability of the starter battery. However, the capacity of the super capacitor arrangement can be significantly lower than that of the starter battery. By way of example, the super capacitor arrangement can hold a quantity of energy corresponding to not more than $\frac{1}{10}$, $\frac{1}{100}$ or $\frac{1}{1000}$ of the quantity of energy that can be stored in the starter battery. The second power store can be provided as an electrostatic store or an electrochemical store, wherein the starter battery is preferably embodied as an electrochemical store. However, the second power store can also be equipped with a capacity that is greater than that of the first power store, and is greater than it for example by a factor of at least 10, 100 or 1000.

A generator having a drive shaft is provided in the third on-board power system branch. Said drive shaft is configured to be connected to the output of an internal combustion engine. The third on-board power system branch furthermore comprises a consumer that is sensitive to voltage dips or spikes, in particular a consumer having a minimal operating voltage, for instance an internal combustion engine controller or on-board electronics. The consumer in the third on-board power system branch can have in particular a maximum rate of change of voltage, such that momentary dips or spikes that are caused in the first on-board power system branch have to be reduced by connecting up the second on-board power system branch.

The load in the third on-board power system branch, i.e. the sensitive consumer, can furthermore also be lighting, in particular exterior and/or interior lighting of the vehicle, which flickers in an undesirable manner if voltage dips occur. The consumer in the first on-board power system branch, i.e. specifically the starter of the internal combustion engine, can furthermore be an electrical drive that requires in particular more than 50, 100, 200, 500 or 1000 amperes for operation, for instance an electrical steering system.

The first, second and third on-board power system branches can be connected in different ways with respect to one another, but the second on-board power system branch is preferably connected up to the third on-board power system branch in a voltage- and current-supporting manner via the control unit and the switching devices thereof. Voltage-supporting connecting up corresponds to a series connection, such that the voltage in the third on-board power system branch increases by the voltage in the second on-board power system branch. Current-supporting connecting up corresponds to a parallel connection of the second on-board power system branch to the third on-board power system branch, such that the third on-board power system branch receives the current from the second on-board power system branch. The externally identifiable internal resistance of the interconnected energy stores is reduced as a result. In the last-mentioned case of the parallel connection, the first on-board power system branch is preferably simultaneously disconnected from the third on-board power system branch, such that the current support by the second on-board power system branch consists in the electrical energy for the backup of the third on-board power system branch originating only from the second on-board power system branch and not from the first on-board power system branch.

The figures symbolically illustrate some on-board power system topologies in which the first, second and third on-board power system branches described here are connected to one another via a control unit such as is described here. Preferably, all the on-board power system branches are connected among one another via the control unit described here. Alternatively, at least the second on-board power system branch is connected to the first and third on-board power system branches via the control unit.

The control unit according to the invention can be implemented by a hardwired logic circuit, by programmable data processing units such as microcontrollers having associated program code, by hardwired logic circuits with program code associated with at least one programmable data processing unit, or a combination. The control unit can comprise a persistent memory that stores configuration data (threshold values, filter parameters, hysteresis parameters, etc). The persistent memory can be embodied as a write-once memory, for instance as a read-only memory (ROM) or else as a flash memory. In particular, the control unit according to the invention can be implemented with a monolithic integrated circuit or with an ASIC, wherein at least one of the components (for instance the supervisory unit) is realized by an element (e.g. a microcontroller) external to the ASIC. The comparator (preferably embodied as a digital comparison device), the state memory and the drive devices are preferably embodied as an integrated circuit, for instance as an ASIC. Furthermore, the analog/digital converter and/or the DC/DC control module can be integrated into said integrated circuit.

FIG. 1 is a schematic illustration of a vehicle on-board power system comprising a first on-board power system branch 10, a second on-board power system branch 20 and a third on-board power system branch 30. The on-board power system branches 10, 20 and 30 are connected to one another by a control unit 40. The first on-board power system branch 10 comprises a consumer 12 and/or an optional consumer 12' and also a first electrical energy store 14 in the form of a lead-acid rechargeable battery. The first electrical energy store 14 corresponds to a first power store and is used as a starter battery. The consumer 12 and/or 12' is an electrical consumer having a high current requirement suitable for generating voltage dips in the on-board power system. The consumer 12 and/or 12' is embodied as a starter motor for an internal combustion engine, in particular as a belt or pinion starter. As an alternative or in combination with respect thereto, as consumer in the first on-board power system branch 10 (or else in the third on-board power system branch 30), provision can be made of an electrical steering drive, for example, the operation of which can likewise generate voltage dips.

An electrical second power store 22 embodied as a lithium rechargeable battery is provided as electrical energy store in the second on-board power system branch. Alternatively, a super capacitor arrangement can be used as the second power store 22. The consumer 24 within the second on-board power system branch 20 constitutes an optional component. The consumer 24 can be realized for example as data control or state monitoring which is assigned to the second power store 22 in order to monitor, control or regulate at least one operating parameter of the second power store 22, for example the state of charge.

The third on-board power system branch 30 comprises a generator and also a consumer 34. The consumer 34 corresponds to a consumer which is protected against control dips by the procedure described here, i.e. a load which is sensitive to voltage dips. The load comprises in particular the lighting or the on-board electronics, for example an engine controller or power, entertainment or driver assistance components. In particular, the consumer 34 is a consumer which offers no or only a restricted functionality in the case of a reduced voltage supply. The consumer 34 can furthermore be a consumer whose function is at least temporarily reduced after a voltage dip, for example components whose function is available only after a boot process.

A control unit 40 is connected to the first, second and third on-board power system branches 10, 20 and 30. In particular, the control unit connects the three on-board power system branches 10-30 among one another. In this case, the control unit connects a supply potential, i.e. the positive supply potential, of the three on-board power system branches 10-30 to one another in a controlled manner. In the topology such as is illustrated in FIG. 1, the on-board power system branches have a common further supply potential, i.e. ground. In order to connect the on-board power system branches 10-30 to the control unit 40, the control unit comprises a first terminal 41, a second terminal 42 and a third terminal 43. The first terminal 41 is configured for connection to the first on-board power system branch 10, the second terminal 42 is configured for connection to the second on-board power system branch 20, and the third terminal 43 is configured for connection to the third on-board power system branch 30. The three terminals 41-43 provided as power terminals are embodied as electrical contacts, for example as plug contacts and/or screw contacts, and are designed, in particular on account of their cross section and material, to transfer current intensities of at least 50 amperes, in particular of at least 100 amperes and preferably of at least 200 amperes.

The control unit 40 comprises a first switching device 50 and also a second switching device 52. The first and second switching devices are embodied in each case as an N-MOSFET. A substrate diode 50' of the first switching device 50 is additionally depicted in the first switching device 50. The substrate diode 50' is illustrated in order to elucidate a possible current flow from the first on-board power system branch 10 to the third on-board power system branch 30 which takes place even without driving of the switching device 50 if the voltage in the third on-board power system branch 30 is correspondingly lower than the voltage in the first on-board power system branch 10. The second switching device 52 also has a substrate diode, which is not depicted in FIG. 1 for reasons of clarity.

The control unit furthermore comprises a circuit arrangement 60, which is explained in greater detail with reference to FIG. 2, and an optional DC/DC converter 70, which has a control input connected to the circuit arrangement 60. Besides a DC/DC control module, the DC/DC converter 70 furthermore comprises two power terminals connected to the first terminal 41 and to the second terminal 42, respectively, in order to supply energy from the first terminal to the second terminal, and/or vice versa.

The first switching device 50 is connected between the first terminal 41 and the third terminal 43 and connects them in a controllable manner. The second switching device 52 is connected between the second terminal 42 and the third terminal 43 and connects them in a controllable manner. A second switching device connected directly to the third terminal 43 is likewise connected to an end of the switching device 50 that is directly connected to the third terminal 43. The switching devices 50 and 52 each comprise a control input, in particular a gate terminal, which is connected to the circuit arrangement 60. The circuit arrangement 60, illustrated in greater detail in FIG. 2, controls the circuit state of the first and second switching devices 50 and 52.

The circuit arrangement 60 furthermore comprises a data input 80, which is explained in greater detail with reference to FIG. 2. The rectangle illustrated by dashed lines in FIG. 1 corresponds to one embodiment of the control unit 40 according to the invention.

Figure 2:
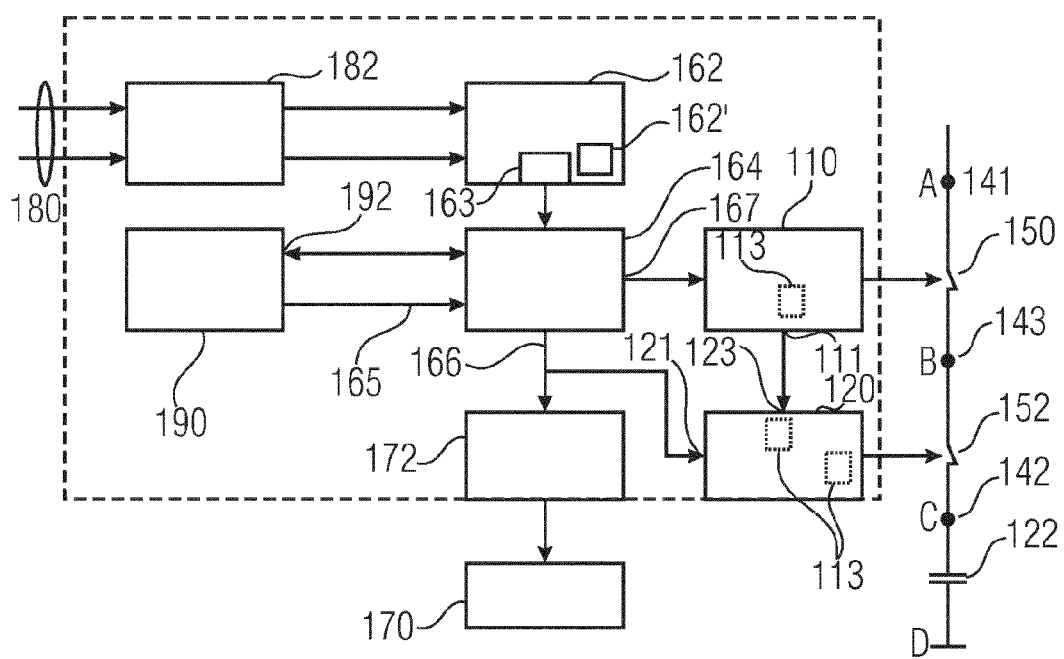
FIG. 2 is a block schematic illustration of one embodiment of the control unit.

FIG. 2 shows a block diagram of one embodiment of the control unit according to the invention in a controllable fashion. The circuit within the dashed rectangle corresponds (apart from the assignment of a DC/DC converter 170) to the circuit arrangement 60 in FIG. 1.

The circuit arrangement illustrated in FIG. 2 comprises a first drive device 110 and a second drive device 120. The drive devices 110 and 120 respectively have control outputs connected to the control inputs of a first switching device 150 and of a second switching device 152. The switching devices 150 and 152 correspond to the switching devices 50 and 52 and are connected in series with one another, as illustrated. The switching devices 150 and 152 are furthermore connected in series with a second power store 122 of the second on-board power system branch. The second terminal 142 is situated between the second power store 122 and the second switching device 152. The third terminal 143 is situated between the first switching device 150 and the second switching device 152. The first terminal 141 is situated on that side of the first switching device 150 which faces away from the second switching device 152. The first, second and third terminals 141-143 and also the first and second switching devices 150, 152 in FIG. 2 correspond to the first, second and third terminals 41, 42 and 43 and the first and second switching devices 50, 52, respectively, in FIG. 1.

A pole A of the circuit illustrated in FIG. 1 can be assigned to the terminal 41, a pole C can be assigned to the second terminal 42, a pole B can be assigned to the third terminal 43 and a pole D can be assigned to the ground of the circuit.

The circuit arrangement illustrated in FIG. 2 furthermore comprises a data input 180. Two preferably analog signals (or the digitized equivalents thereof) are present at said data input, said signals corresponding to two operating parameters of the first or third on-board power system, in particular the operating voltage in the first or third on-board power system branch 30, and the current that flows via the first switching device 50, 150. For this purpose, the data input 180 comprises two separate lines via which the circuit arrangement illustrated in FIG. 2 receives analog signals.

The control unit illustrated in FIG. 2 furthermore comprises an analog/digital converter 182, which converts the signals of the data input 180 into digital signals. A level converter can also be provided instead of the analog/digital converter 182.

Current and voltage determining units can be provided, which detect the current via the first switching device 50, 150 and, respectively, the voltage at the first or third terminal 43, 143, cf. FIG. 1. Since the location of the current determining unit corresponds to the location of the switching device 50 or 150 and the location of the voltage determining unit corresponds to the location of the third terminal 43, 143, further drawing elements for representing the detection devices have been omitted for reasons of clarity, since the existing drawing elements for representing the terminals 41, 43 or 141, 143 can also be used for representing the detection devices.

Furthermore, the current determining unit is preferably provided at or between the first and third terminals 41 or 141 and 43 or 143. The current determining unit is thus connected upstream or downstream of the first switching device 50 or 150 and detects the current that flows through the latter. Furthermore, the voltage determining unit can be connected in parallel with the consumer 34 or 134 that is sensitive to voltage dips. In particular, the voltage determining unit detects the potential of the positive terminal of the consumer 34 or 134 in order to detect voltage dips. The signals generated by the current determining unit and the voltage determining unit are fed to the circuit arrangement 60 via the data input 80 or 180.

The current determining unit can be provided by a shunt resistor or by a Hall element, while the voltage determining unit can be provided by a simple contact or by a tap connected, if appropriate, to a voltage divider. The tap or the voltage divider supplies the signal which is fed to the data input 80 or 180 of the circuit arrangement 60.

The analog/digital converter 182 transfers the converted digital signals to a comparator 162 of the control unit. The comparator comprises a predefinition 162', with which the signals output by the analog/digital converter 182 are compared. The comparator furthermore comprises a logic 163, which carries out a logic combination of the comparison results that are results of the comparison of the predefinition 162'. The logic 163 combines the individual comparison results arising from the individual comparisons of the signals with the predefinition 162'.

The comparator 162 outputs a supply state to a state memory 164, wherein the supply state corresponds to the comparison result generated by the logic 163 of the comparator 162. The state memory 164 has a CLEAR input connected to the output of the comparator 162. The state memory 164 has a flip-flop functionality, in particular the functionality of an asynchronous flip-flop. The latter assumes a state in accordance with the CLEAR input and in accordance with a SET input 165. In this case, the SET input is dominant over the CLEAR input in the state definition of the state memory 164. The SET input 165 corresponds to an input for an enable signal.

A supervisory unit 190 has an output connected to the SET input 165. Via the latter, an enable signal is output to the state memory 164 by the supervisory unit 190, which corresponds to the SET signal. The supervisory unit 190 furthermore has an input 192, via which operating parameter signals of the vehicle on-board power system or of the vehicle itself can be transferred to the supervisory unit 190. In particular, the supervisory unit 190 is connected to the state memory 164 via a preferably bidirectional connection.

Diagnosis signals and/or test signals can furthermore be communicated via said connection. Via the connection, the supervisory unit 190 can receive state levels of the state memory 164 and can furthermore set states stored in the state memory 164. The setting of states in the state memory by the supervisory unit 190 has priority over the SET signal and over the CLEAR signal. Instead of or in combination with the comparator, the control unit can comprise an evaluation device as described above. Said evaluation device is provided at the same location as the comparator 162 and is not given its own reference sign for the sake of clarity. Moreover, the reference sign 162 and the associated drawing element can also be applicable to the evaluation device.

The state memory 164 furthermore has an output 166 via which an authorization signal is transmitted to the second drive device 120 connected there. The state memory furthermore comprises an output 167 via which it is connected to the first drive device 110 in order to communicate a switching signal to the first drive device 110. On the basis of the switching signal, the first drive device 110 generates a control signal for the control input of the switching device 150. As a result, the first drive device 110 implements the switching signal 167 directly in a driving of the first switching device 150.

The second drive device 120 comprises an authorization input 121, via which said second drive device is connected to the output 166 of the state memory 164. Furthermore, the second drive device 120 has a switch state input 123 connected to a switch state output 111 of the first drive device 110. The signal at the switch state output 111 of the first drive device 110 does not necessarily correspond to the switching signal at the switching signal output 167 of the state memory. Rather, the switch state output 111 corresponds to the actual switching signal that is output to the first switching device 150 and that is transferred to the switching device 150 by the drive device 110. The second drive device is configured to output a switching signal for closing the second switching device 152 to the second switching device 152 only if a corresponding signal is present both at the switch state input 123 and at the authorization input 121. This means that the second drive device 120 drives the second switching device 152 for closing only if an authorization is present at the authorization input 121 and if a signal representing an open switching device 150 is furthermore present at the switch state input 123. The switch state output of the first drive device 110 then outputs a signal corresponding to an open first switching device 150 if the control output of the first drive device 110 connected to the first switching device 150 provides a drive signal that drives the first switching device for opening.

The control unit can have a delay element that delays the closing of the second switching device 152. For this purpose, the delay element can be provided in the second drive device 120 in order to delay the signal outputting thereof or the signal input thereof, cf. reference signs 121 and 123. The delay element can furthermore be provided in the first drive device in order to delay the outputting of the switch state signal. The delay duration of the delay element can be stored in a memory of the control unit, for instance a read-only memory or a flash memory. The delay duration can be configurable or programmable, for instance by a signal that is output by the supervisory unit. Equally, the reception or the processing of the switch state signal within the second drive device can be delayed by the delay element present there. Finally, a delay element can be provided between the state memory 164 and the second drive device 120 in order to delay the authorization signal. Various possible locations of the delay element are represented by the reference sign 113, wherein preferably the delay element is provided within the second drive device and is directly connected upstream of the control output of the second drive device 120 connected to the second switching device 152. The delay element delays in particular only the closing of the second switching device 152 and does not delay the closing of the first switching device 150, or delays it only to a lesser extent.

The embodiment illustrated in FIG. 2 furthermore comprises a DC/DC control module 172 and a DC/DC converter 170 connected thereto and driven thereby. The DC/DC converter 170 has power terminals connected to the second terminal 142 and the first terminal 141. The current flow paths between the first and second terminals and the DC/DC converter 170 have not been illustrated in FIG. 2, for reasons of clarity. With regard to the location of the DC/DC converter 170, FIG. 2 illustrates an alternative to the arrangement in FIG. 1, wherein the DC/DC converter can be part of the circuit arrangement (not illustrated) or can be provided externally to the circuit arrangement, as illustrated in FIG. 2. However, the DC/DC converter is preferably part of the control unit according to the invention, as is illustrated schematically in FIG. 1. The DC/DC control module 172 is designed, in the case of an authorization signal being present (i.e. in the case of authorization being present), to exhibit operation of the one additional activation input, such that the DC/DC control module, despite an authorization signal being present, permits the operation of the DC/DC converter if an activation signal is present. If the authorization signal is present, the first switching device 150 can be opened; however, if the first switching device 150 does not output an opening signal, the second switching device 152 cannot be closed. It is preferably provided that the first switching device 150 cannot be opened if no authorization signal is present. The DC/DC control module 172 preferably remains active if no authorization signal is present. The DC/DC control module 172 preferably becomes inactive if an authorization signal is present. However, it can also be provided that the DC/DC control module remains active if an authorization signal is present. The last-mentioned possibility can be set and/or turned off by a variable configuration. Furthermore, it is possible to set the fact that the DC/DC control module is activated or deactivated independently of switching states of the switching devices and/or independently of the authorization signal.

The DC/DC control module 172 receives the authorization signal in particular for a circuit point which is also connected to an authorization input of the second drive device. The circuit point is connected downstream of the authorization signal output 166 of the state memory 164 or corresponds thereto.

The inputs 121 and 123 of the second drive device 120 are preferably embodied in such a way that the second drive device 120 outputs a signal for closing the second switching device if a high level or some other level that serves as a switch-on signal is present at both inputs 121, 123. As a result, approximately upon interruption of the signal flow, the switching device 152 cannot be closed since in the case of an open input (floating) no high level (low level) is present which would cause the second switching device 152 to be closed by the second drive device 120.

A pole A of the circuit illustrated in FIG. 2 can be assigned to the terminal 141, a pole C can be assigned to the second terminal 142, a pole B can be assigned to the third terminal 143 and a pole D can be assigned to the ground of the circuit.

Figure 3A:
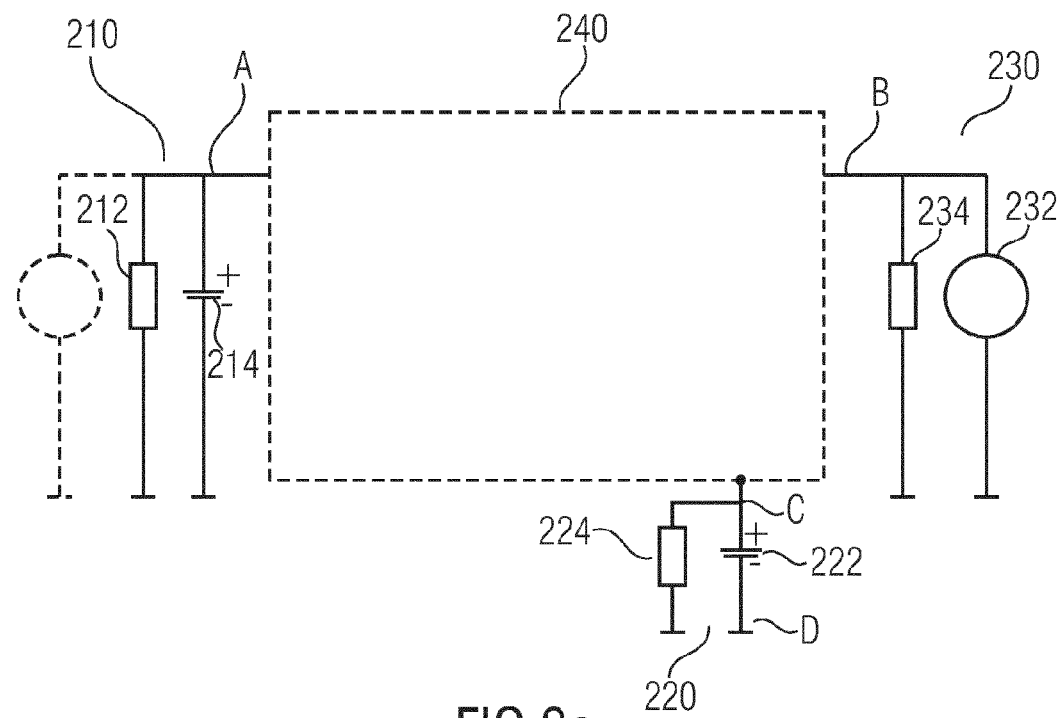
FIGS. 3a, 3b and 3c are schematic illustrations of different on-board power system topologies in which the control unit can be used, according to one embodiment.
Figure 3B:
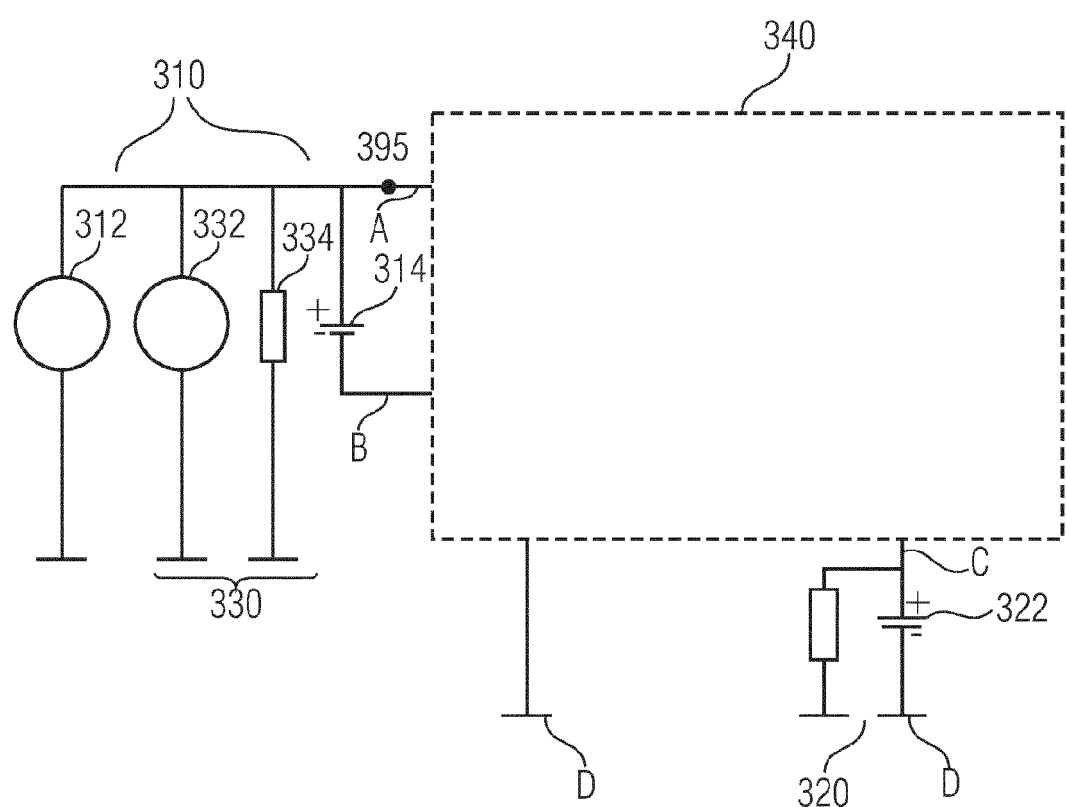
Figure 3C:
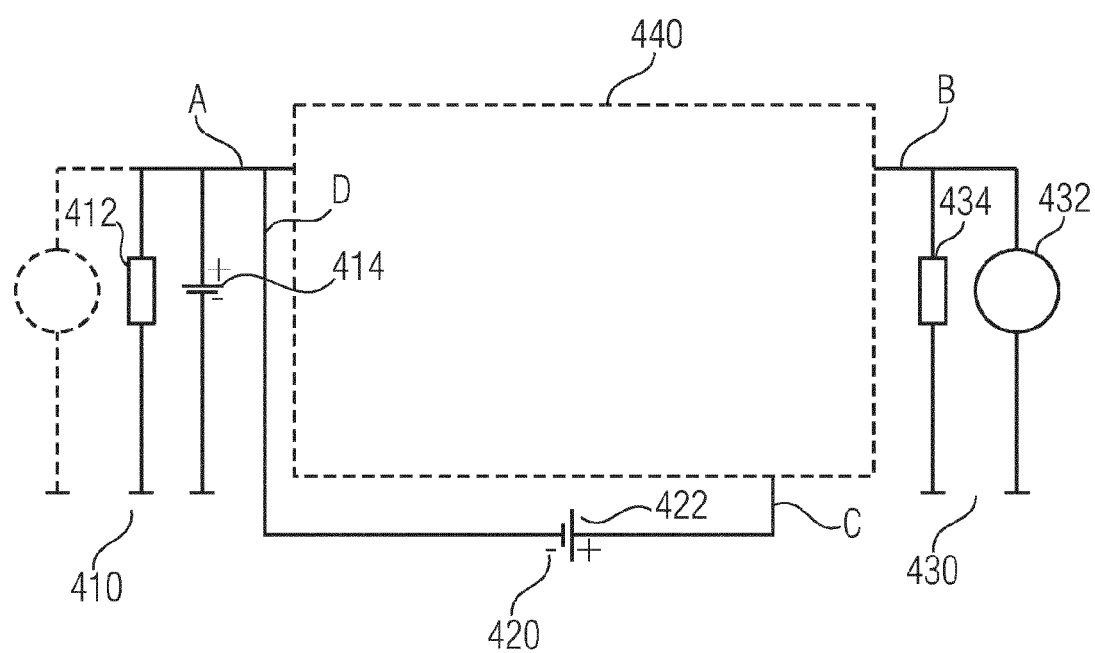

FIGS. 3a-3c show various on-board power system topologies in which the control unit described here can be used. FIGS. 3a-3c illustrate different arrangements of on-board power system branches and a respective control unit, wherein the control unit is represented by a dashed rectangle in FIGS. 3a-3c.

The topology in FIG. 3a corresponds to the topology in FIGS. 1 and 2. A first on-board power system branch 210 comprises as electrical energy store a first power store 214 and a dynamic consumer 212, the operation of which can lead to voltage dips. A second on-board power system branch 220 comprises a second power store 222 as electrical energy store and a consumer 224, which is for example the operation monitoring electronics of the second power store 222. The consumer 224 is represented only for the sake of completeness; the current demand resulting from the consumer 224 is negligible in comparison with the current demand of the consumer 212 or of the consumer 234. The third on-board power system branch 230 comprises a generator 232 and a consumer 234, which is sensitive to voltage dips, for example a consumer having a minimal operating voltage.

One embodiment of the control unit 240 according to the invention connects these on-board power system branches among one another and therefore comprises three power terminals in order to connect the respective positive potentials of the three on-board power system branches 210-230 to one another in a controlled manner. In the normal case, the control unit 240 connects the first on-board power system 210 to the third on-board power system 230. Via this connection, the first power store 214 (for instance a lead-acid rechargeable battery) receives electrical energy from the generator 232. The first and third on-board power system branches form an on-board power system portion in which both the potentially disturbing consumer 212 and the consumer 234 that is sensitive to voltage dips are connected to one another. In this case, the consumer 234 receives electrical energy both from the first power store 214 and from the generator 232. If the consumer 212 generates a disturbance, then the control unit 240 disconnects the third on-board power system branch from the first on-board power system branch 210. In order to close the resulting supply gap, the second on-board power system branch 220 is connected up, in particular in parallel with the third on-board power system branch 230.

In an alternative embodiment, the generator 232 is not provided within the third on-board power system branch, but rather within the first on-board power system branch 210, cf. dashed lines. In this case, in the event of voltage dips, the connection between the first and second on-board power system branches 210, 230 is disconnected by the control unit 240 and the consumer 234 is subsequently supplied (only) by the second power store 222.

The topology illustrated in FIG. 3a has a pole A at the transition from the control unit 240 to the first on-board power system branch 210, a pole C at the transition from the control unit 240 to the second on-board power system branch 220, a pole B at the transition from the control unit 240 to the third on-board power system branch 230, and a pole D corresponding to ground.

FIG. 3b illustrates a further on-board power system topology in which the control unit described here can be used. FIG. 3b shows one embodiment of a control unit 340 according to the invention that connects a second on-board power system branch 320 to a first and a third on-board power system branch 310 and 330. The first on-board power system branch comprises a consumer in the form of a starter motor 312 for an internal combustion engine and also a first power store 314 as an electrical energy store. The third on-board power system branch 330 comprises a generator 332 and a consumer 334 that is sensitive to control dips, for instance on-board electronics. While the starter 312, the generator 332 and the consumer 334 that is sensitive to voltage dips are interconnected, only one terminal of the first power store 314 is connected to the first and third on-board power system branches 310, 330, while a further terminal, in particular the negative pole, is connected to the control unit 240.

The control unit is furthermore connected to ground, as is illustrated on the left-hand side of the lower edge of the control unit 340. In the normal case, the first energy store 314 is directly connected to ground. If a voltage dip occurs at the load 334 that is sensitive to the voltage dips, then the control unit 340 connects the first power store 314 not to ground, but rather in series with the second power store 322 of the second on-board power system branch. The series connection results in a higher voltage composed of the voltage of the two energy stores 314 and 322. The consumer 334 that is sensitive to voltage dips and the consumer 312 (in the form of a starter motor) are supplied with said voltage. The additional connection in series with the second power store 322 at least partly compensates for the voltage dip. This backs up the voltage supply for the third on-board power system branch 330, even if the third on-board power system branch 330 remains (partly) connected to the first on-board power system branch 310. As a result of the connection in series with the second on-board power system branch in the case of a critical supply state, the third on-board power system branch is connected to the first on-board power system branch in a different way than in the case of a non-critical supply state.

The control unit 340 can comprise an additional terminal 395, which is connected to the first and third on-board power system branches, wherein a DC/DC converter (cf. FIG. 1) is provided within the control unit, said DC/DC converter connecting said additional terminal 395 to the second on-board power system branch 320. Via the DC/DC converter, energy from the first or third on-board power system branch can be supplied to the second on-board power system branch 320, usually in the normal operating mode, in order to recharge the second power store 322 of the second on-board power system branch 320.

In FIG. 3b (or else in FIG. 3c), the control unit serves as a changeover switch between ground and the positive pole of the second on-board power system branch 320. By the control unit 340 it is possible to choose whether the negative pole of the first energy store 314 is connected directly to ground or to the positive pole of the second on-board power system branch 320. What is achieved by this changeover is that the voltage of the energy store 314 is present at the first and third on-board power system branches in the normal case and a voltage resulting from the sum of the voltages of energy store 314 and of energy store 322 can be applied in the case of a voltage dip.

The topology illustrated in FIG. 3b has a pole A at the transition from the control unit 340 to the first on-board power system branch 310, a pole C at the transition from the control unit 340 to the second on-board power system branch 320, a pole B at the transition from the control unit 340 to the first energy store 314 and a pole D corresponding to ground, in particular the ground of the second on-board power system branch 320. The control unit 340 is configured to connect the pole B, i.e. the negative terminal of the first energy store 314, either to pole D (i.e. to ground) or to pole C (i.e. to the positive terminal of the second energy store 322). The last-mentioned possibility leads to the series connection of the first and second energy stores in order to be able to supply the on-board power systems 310 and 330 with the voltage increased as a result.

The topology illustrated in FIG. 3c comprises a first on-board power system branch 410 having a consumer 412, for instance in the form of a starter motor for an internal combustion engine, and a first power store 414. The operation of the consumer 412, can lead to voltage dips. The topology illustrated in FIG. 3c furthermore comprises a third on-board power system branch 430 having a generator 432 and a consumer 434, which is sensitive to voltage dips. A second on-board power system branch 420 comprises a second power store 422. The control unit 440 connects the first, second and third on-board power system branches 410, 420 and 430 to one another. In the normal case, i.e. without support by the second on-board power system branch 420, the first on-board power system branch 410 is directly connected to the third on-board power system branch 430. If voltage dips occur in the third on-board power system branch 430 in particular at the consumer 434, the direct connection between the first and third on-board power system branches is disconnected and the first on-board power system branch is connected in series with the second on-board power system branch 420. The third on-board power system branch 430 is connected in parallel with this series connection, and so it receives the sum of the voltages of the first and second on-board power system branches. A negative terminal of the on-board power system branch 420 is connected to the positive terminal of the on-board power system branch 410 (in order that the voltages can be added). The positive pole or terminal of the second on-board power system branch is connected to the positive terminal of the third on-board power system branch 430 via the second switching device (cf. FIGS. 1 and 2). The first switching device is connected between the first and third on-board power system branches in the control unit 440 (cf. FIGS. 1 and 2).

The topology illustrated in FIG. 3c in the form of a four-pole network has a pole A at the transition from the control unit 440 to the first on-board power system branch 410, a pole C at the transition from the control unit 440 to the positive terminal of the second power store 422, a pole B at the transition from the control unit 440 to the third on-board power system branch 430 and a pole D corresponding to the negative terminal of the second energy store 422. Since the negative terminal of the second energy store 422 (i.e. the negative terminal of the second on-board power system branch 420) is fixedly connected to the first on-board power system branch, the first pole A corresponds to the pole D, such that these can be combined to form a common pole. Combining the pole A and the pole D to form a common pole would result in a three-pole network.

LIST OF REFERENCE SIGNS

10, 210, 310, 410 First on-board power system branch
12, 212, 312, 412 Consumer (starter motor)
14, 214, 314, 414 First power store
20, 220, 320, 420 Second on-board power system branch
22, 222, 322, 422 Second power store
24, 224 Consumer in the second on-board power system branch
30, 230, 330, 430 Third on-board power system branch
40, 240, 340, 440 Control unit
41, 141 First terminal
42, 142 Second terminal
43, 143 Third terminal
50, 150 First switching device
50' Substrate diode
52, 152 Second switching device
60 Circuit arrangement within the control unit according to the invention
70, 170 DC/DC converter
172 DC/DC control module
111 Switch state signal output
113 Delay element
121 Authorization signal input
123 Switch state signal input
162 Comparator
162' Predefinition of the comparator
163 Logic
164 State memory
165 Enable signal input
166 Authorization signal output
167 Control signal output
80, 180 Data input
182 Analog/digital converter
190 Supervisory unit
192 Input for operating parameter signals of the vehicle on-board power system or of the vehicle
395 Additional terminal of the control unit
A-D Poles

What is claimed is:

1. A method for controlling power distribution among a plurality of on-board power system branches of an on-board power system of a vehicle, the method comprising:
    monitoring the supply state in a first on-board power system branch or in a third on-board power system branch;
    in response to a critical supply state occurring in the first or third on-board power system branch:
        disconnecting the first on-board power system branch from the third on-board power system branch by opening a first switching device, and
        after the first switching device has been opened, connecting a second on-board power system branch to the third on-board power system branch by closing a second switching device,
        wherein the first switching device is driven by a first drive device, and
    wherein the second switching device is driven by a second drive device that receives a switch state signal from the first drive device, wherein the second drive device drives the second switching device for closing only if the switch state signal signals an open first switching device;
    the first drive device is driven by a switching signal;
    the switching signal is output to the first drive device from a state memory;
    an authorization signal is furthermore output to the second drive device from the state memory; and
    the second drive device drives the second switching device for closing only if the switch state signal signals the open first switching device and the authorization signal signals an authorization being present,
    wherein the state memory outputs the switching signal for opening the first switching device and the authorization signal for closing the second switching device only if an enable signal is present at the state memory, wherein the enable signal is output in the form of a binary SET signal.

2. The method of claim 1, wherein
the enable signal is output by a supervisory unit, and
the supervisory unit compares a speed signal of the vehicle with at least one predefined speed limit and outputs the enable signal only in the case of speeds which do not exceed the speed limit.

3. The method of claim 2, wherein:
the supervisory unit furthermore receives:
   the switch state signal provided for the second drive device,
   at least one operating parameter or a supply state of the third on-board power system,
   a load signal representing load operation in the first on-board power system branch, and
   a switching signal output to the first drive device and/or a switching signal output to the second drive device, and
the supervisory unit outputs the authorization signal as a SET signal.

4. The method of claim 1, wherein the supply state is monitored by:
   comparing at least one operating parameter of the first and/or third on-board power system with a standard predefinition by a comparator, which outputs the supply state as comparison result, or
   evaluating a load signal representing load operation in the first and/or third on-board power system branch, preferably in the form of a binary CLEAR signal, wherein in the context of monitoring, as operating parameter(s) of the first and/or third on-board power system branch, a supply voltage in the first and/or third on-board power system branch and/or a current flow leading away from or toward the first and/or third on-board power system branch are/is compared with the standard predefinition, and a switch-on signal for a starter motor within the first or third on-board power system branch is evaluated as load signal.

5. The method of claim 4, wherein the monitoring is carried out by comparing by the comparator and the at least one operating parameter is represented by at least one analog signal, wherein the at least one analog signal is converted into at least one digital signal by an analog/digital converter, wherein the comparator compares the at least one digital signal representing the at least one operating parameter with the standard predefinition.

6. The method of claim 4, wherein the comparator compares at least two operating parameters with the standard predefinition, the comparator generates an individual comparison result for each operating parameter, and the comparator outputs a comparison result corresponding to a logic combination of the individual comparison results.

* * * * *